United States Patent [19]

Rousso et al.

[11] Patent Number: 5,765,938

[45] Date of Patent: *Jun. 16, 1998

[54] SLEEVE RETENTION FOR FLEXIBLE CORE OF A FLASHLIGHT

[75] Inventors: John G. Rousso, Beacon Falls; Paul R. Holbrook, Shelton, both of Conn.

[73] Assignee: Black & Decker Inc., Newark, Del.

[*] Notice: The term of this patent shall not extend beyond the expiration date of Pat. No. 5,517,392.

[21] Appl. No.: 547,075

[22] Filed: Oct. 23, 1995

Related U.S. Application Data

[63] Continuation of Ser. No. 286,852, Aug. 5, 1994, Pat. No. 5,517,392.

[51] Int. Cl.$^6$ ............................................. F21L 15/08
[52] U.S. Cl. .................... 362/198; 362/194; 362/199; 362/285; 362/421; 439/162; 439/350; 174/111
[58] Field of Search ................... 439/162, 333, 439/350, 352, 928; 362/194–199, 226, 285, 421; 174/85, 86, 111; 403/76, 103, 122, 126, 134, 56, 292, 294, 305, 308, 315, 360, 374, 375; 248/160, 276.1

[56] References Cited

U.S. PATENT DOCUMENTS

| | | | |
|---|---|---|---|
| D. 268,442 | 3/1983 | Darmon | D26/24 |
| D. 321,062 | 10/1991 | Bonbright | D26/140 |
| D. 344,602 | 2/1994 | Yuen | D26/42 |
| 549,724 | 11/1895 | Hitchcock | 362/285 |
| 599,543 | 2/1898 | Whitaker | 248/160 |
| 912,308 | 2/1909 | Grimler | 362/413 |
| 1,232,824 | 7/1917 | Mayhew | 362/202 |
| 1,279,803 | 9/1918 | Watson | 248/160 |
| 1,292,884 | 1/1919 | Robson | 174/111 |
| 2,147,356 | 2/1939 | Scholtes | 285/256 |
| 2,427,890 | 9/1947 | White | 34/647 |
| 2,510,198 | 6/1950 | Tesmer | 248/160 |
| 2,533,494 | 12/1950 | Mitchell, Jr. | 248/160 |
| 2,705,279 | 3/1955 | Berlinger | 362/197 |
| 2,740,826 | 4/1956 | Bondon | 174/111 |
| 3,479,499 | 11/1969 | Dahl | 362/198 |
| 3,584,822 | 6/1971 | Oram | 248/160 |
| 3,961,175 | 6/1976 | Otagoshi | 362/199 |
| 3,962,678 | 6/1976 | Kurokawa | 362/275 |
| 4,023,757 | 5/1977 | Allard et al. | 248/70 |
| 4,064,614 | 12/1977 | Horvath | 29/890.144 |
| 4,111,469 | 9/1978 | Kavick | 285/256 |
| 4,111,514 | 9/1978 | Brishka et al. | 439/680 |
| 4,117,535 | 9/1978 | Holt | 362/382 |
| 4,150,466 | 4/1979 | Horvath | 29/417 |
| 4,212,487 | 7/1980 | Jones et al. | 285/95 |
| 4,305,560 | 12/1981 | Ban | 248/160 |

(List continued on next page.)

FOREIGN PATENT DOCUMENTS

| | | | |
|---|---|---|---|
| 554052 | 3/1958 | Canada | 362/198 |
| 95 30 4141 | 9/1995 | European Pat. Off. | |
| 631237 | 6/1936 | Germany | 439/447 |
| 24 25 373 | 12/1975 | Germany. | |
| GM 79 29 287 | 10/1979 | Germany. | |
| 1634-935 | 3/1991 | U.S.S.R. | |
| 117285 | 7/1918 | United Kingdom. | |
| 218 193 | 7/1924 | United Kingdom. | |
| 971866 | 10/1964 | United Kingdom. | |
| 2 046 388 | 11/1980 | United Kingdom. | |

*Primary Examiner*—Alan Cariaso
*Attorney, Agent, or Firm*—Barry E. Deutsch

[57] ABSTRACT

A flashlight includes a flexible core comprising a pair of conductive wires which electrically connect a source of power to a power using implement. A flexible spine surrounds the pair of conductive wires and includes a plurality of interconnected universally rotatable members. A resilient sleeve engages the outer surface of the rotatable members forming the spine. The flashlight includes a working end housing and a base housing. A first anchor connects one end of the flexible core to the base end housing and a second anchor connects the other end of the flexible core to the working end housing. The outer surface of the resilient sleeve is restrained against relative twisting or longitudinal movement with respect to each housing.

67 Claims, 8 Drawing Sheets

U.S. PATENT DOCUMENTS

| | | | |
|---|---|---|---|
| 4,437,144 | 3/1984 | Guenther | 362/275 |
| 4,533,982 | 8/1985 | Kozar | 362/183 |
| 4,733,337 | 3/1988 | Bieberstein | 362/206 |
| 4,839,106 | 6/1989 | Steiner | 261/28 |
| 4,853,965 | 8/1989 | Blonski | 381/205 |
| 4,869,552 | 9/1989 | Tolleson et al. | 297/296 |
| 4,907,137 | 3/1990 | Schladitz et al. | 362/145 |
| 4,916,596 | 4/1990 | Sharrah et al. | 362/190 |
| 4,977,489 | 12/1990 | Fung | 362/184 |
| 4,998,190 | 3/1991 | Claessen | 362/306 |
| 5,033,528 | 7/1991 | Volcani | 160/351 |
| 5,063,933 | 11/1991 | Takahashi | 128/653.5 |
| 5,076,615 | 12/1991 | Sampson | 285/253 |
| 5,150,710 | 9/1992 | Hall et al. | 128/653.5 |
| 5,154,483 | 10/1992 | Zeller | 362/198 |
| 5,217,297 | 6/1993 | Yuen | 362/184 |
| 5,369,556 | 11/1994 | Zeller | 362/198 |
| 5,383,633 | 1/1995 | Ellestad | 248/160 |
| 5,385,500 | 1/1995 | Schmidt | 446/73 |
| 5,397,304 | 3/1995 | Truckai | 604/95 |
| 5,398,176 | 3/1995 | Ahuja | 362/253 |
| 5,454,737 | 10/1995 | Saba | 439/350 |
| 5,517,392 | 5/1996 | Rousso et al. | 362/198 |

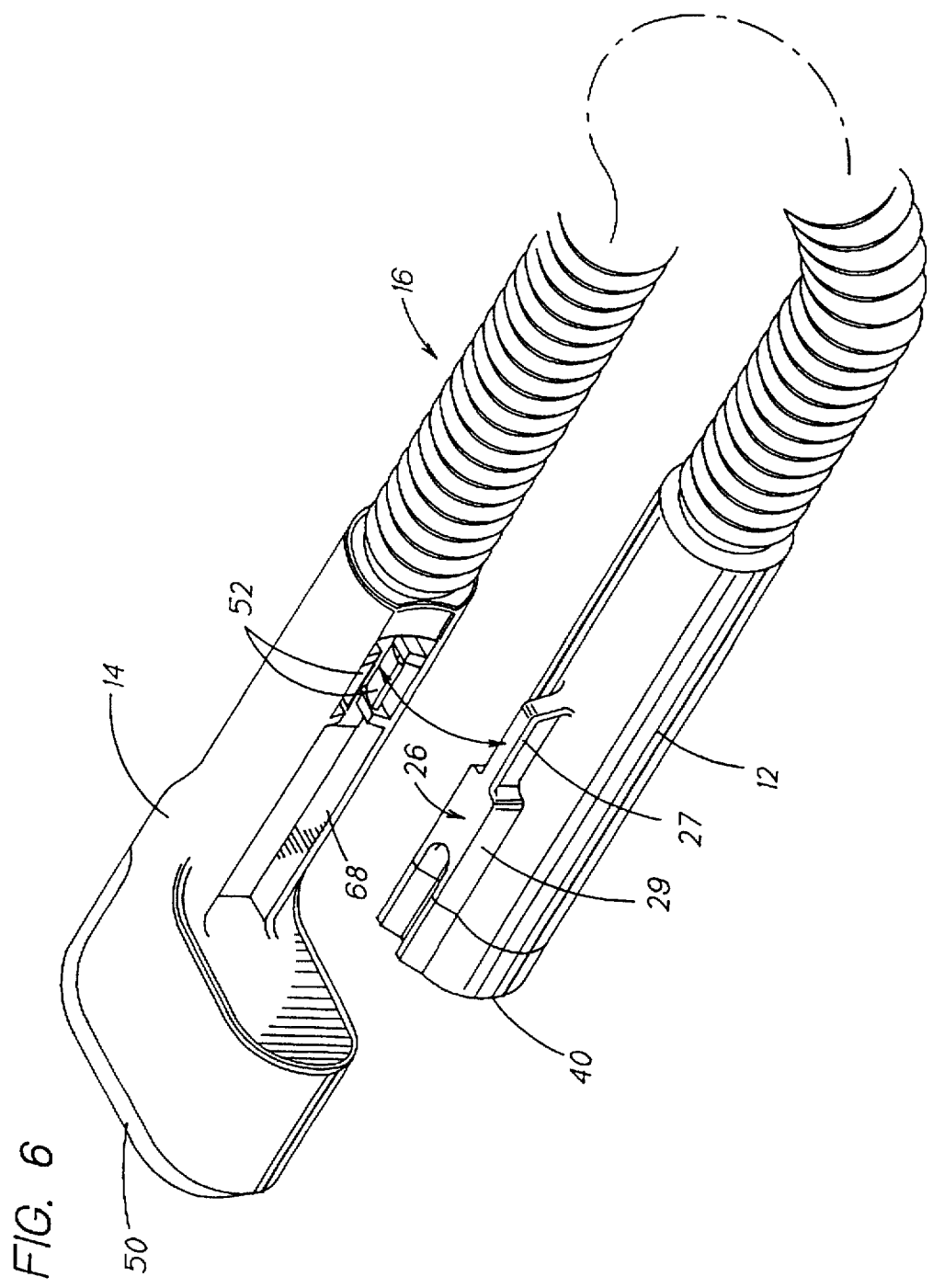

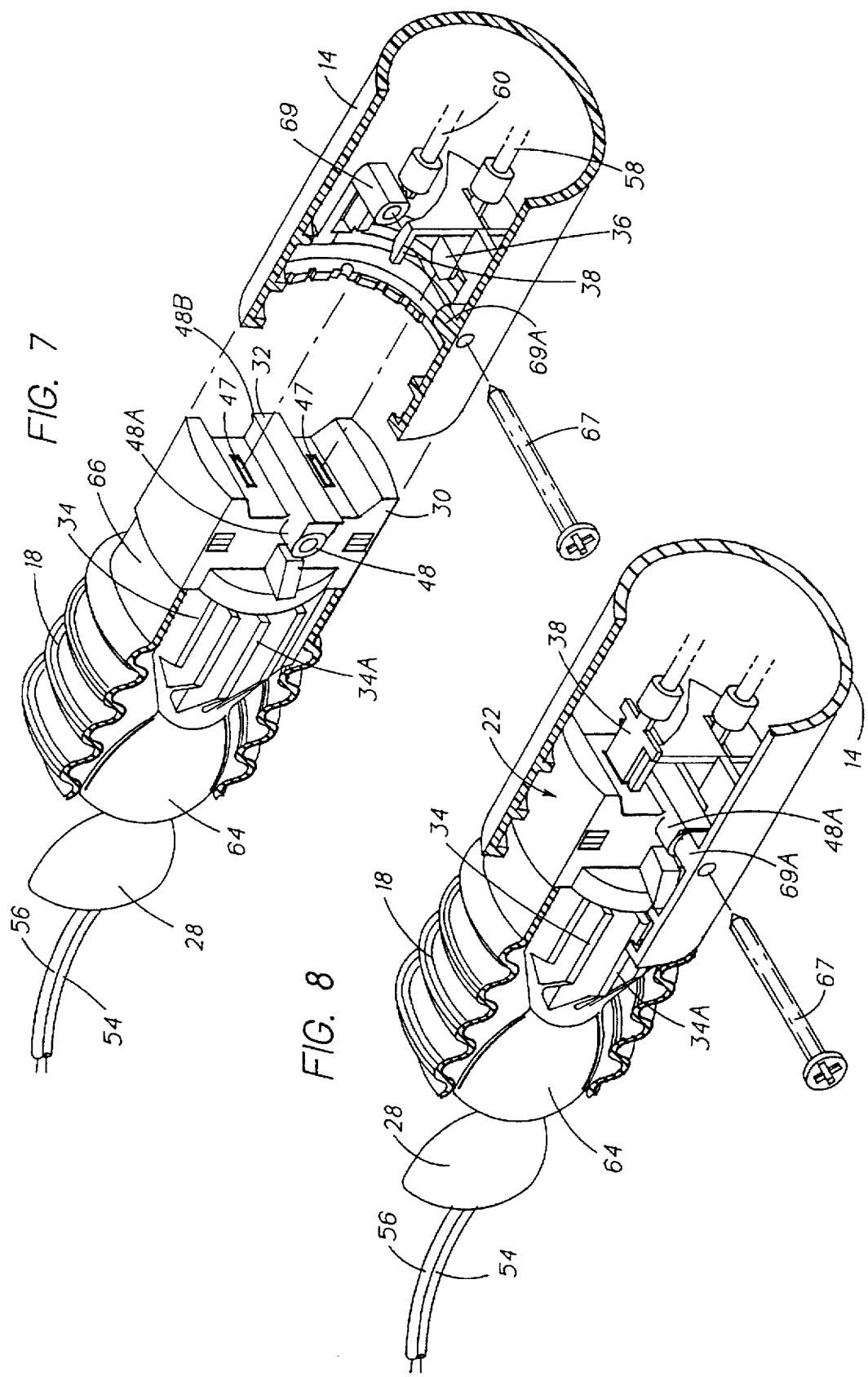

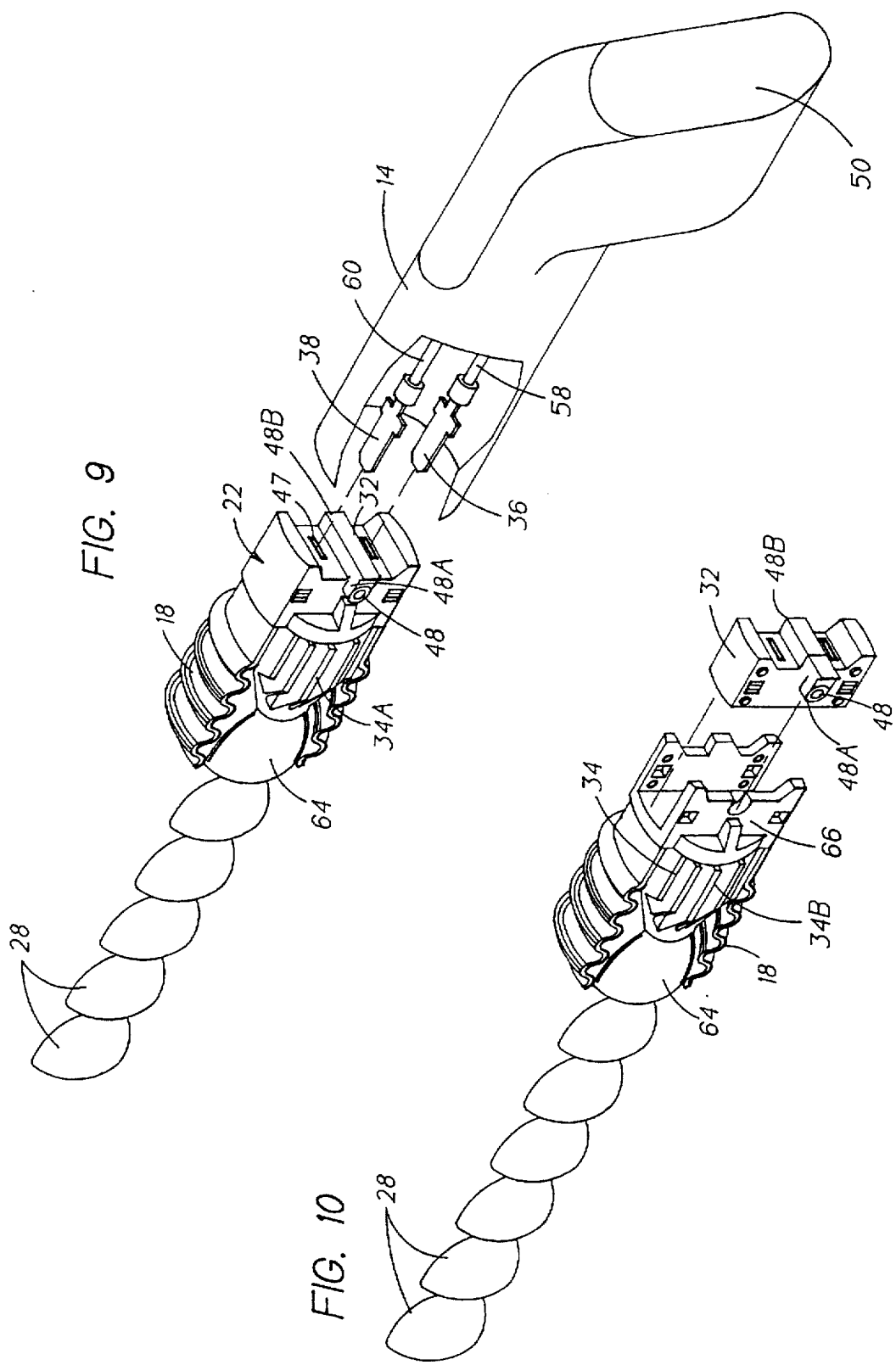

SLEEVE RETENTION FOR FLEXIBLE CORE OF A FLASHLIGHT

This is a continuation of application Ser. No. 08/286,852 filed on Aug. 5, 1994 now U.S. Pat. No. 5,517,392.

BACKGROUND OF THE INVENTION

This invention relates to a hand-held flashlight and in particular to such a flashlight having a flexible core which may be pulled or twisted relative to a power end housing and/or a working end housing.

In co-pending U.S. patent application, Ser. No. 08/286,313 filed Aug. 5, 1994 now U.S. Pat. No. 5,521,803 concurrently herewith in the names of Lee Eckert, Robert Kubicko and Julian Watt entitled "Flashlight With Flexible Core" and assigned to the same assignee as the assignee hereof, there is disclosed a flashlight with a flexible core. In the flashlight, a pair of conductive wires electrically connect a source of power to a power using implement. A flexible spine surrounds a pair of conductive wires and includes a plurality of interconnected universally rotatable members. A resilient sleeve engages the outer surface of the rotatable members forming the spine. Each end of the spine is connected to a corresponding anchor. One anchor connects one end of the spine to the power end housing and a second anchor connects the other end of the spine to the working end housing of the flashlight.

Each of the anchors fits within a corresponding bore formed in each of the two housings of the flashlight. The opposite ends of the resilient sleeve fit over the outer surface of a corresponding anchor and are thus sandwiched between the inner surface of the bore of one of the housings and the outer surface of the anchor held within the bore.

The flexible spine of the flashlight enables the flashlight to be bent, coiled or draped into various positions. Both the torsional and pulling forces applied to the flexible spine and to the resilient sleeve as a consequence of the bending, coiling or draping of the flexible core into various positions have a tendency to separate the core from the flashlight housings.

Accordingly it is an object of this invention to prevent the resilient sleeve of a flashlight having a flexible core from being separated from the housing sections of the flashlight either through torsional or axial forces and to prevent damage to the flexible spine and internal conductors due to excessive torsional action.

SUMMARY OF THE INVENTION

The foregoing object and other objects of this invention are attained in a flashlight including a base housing forming a power end for the flashlight and having a longitudinally extending bore having at least one battery housed therein. A working end housing is spaced from the base and supports a reflector, a lens and a light bulb. The working end housing includes means defining a longitudinally extending bore. A flexible core assembly connects the base housing to the working end housing and includes a pair of conductive wires electrically connecting the battery to the light bulb, a flexible spine surrounding the pair of conductive wires and including a plurality of interconnected and universally rotatable members, and a resilient sleeve member engaging an outer surface of each of the rotatable members forming the spine. A first anchor is connected to a first end of the flexible core and has a portion extending within the bore of the base housing. The first anchor includes first gripping means underlying the sleeve of the flexible core and the base housing bore includes second gripping means overlying the sleeve of the flexible core sandwiching the sleeve between the first and second gripping means. A second anchor is connected to a second end of the flexible core and has a portion extending within the bore of the working end housing. The second anchor includes third gripping means underlying the sleeve of the flexible core and said working end housing bore includes fourth gripping means overlying the sleeve of the flexible core to sandwich the sleeve between said third and fourth gripping means.

BRIEF DESCRIPTION OF THE DRAWING

FIG. 6 is a perspective view of the flashlight in a somewhat folded position illustrating the manner in which the two housings of the flashlight may be joined together;

FIG. 7 is a perspective exploded view of a portion of the flashlight;

FIG. 8 is a view similar to FIG. 7 showing the parts in their assembled state;

FIG. 9 is an exploded perspective view of a further portion of the flashlight;

FIG. 10 is an exploded perspective view of a subassembly of the flashlight;

DESCRIPTION OF THE PREFERRED EMBODIMENT

Figure 1:
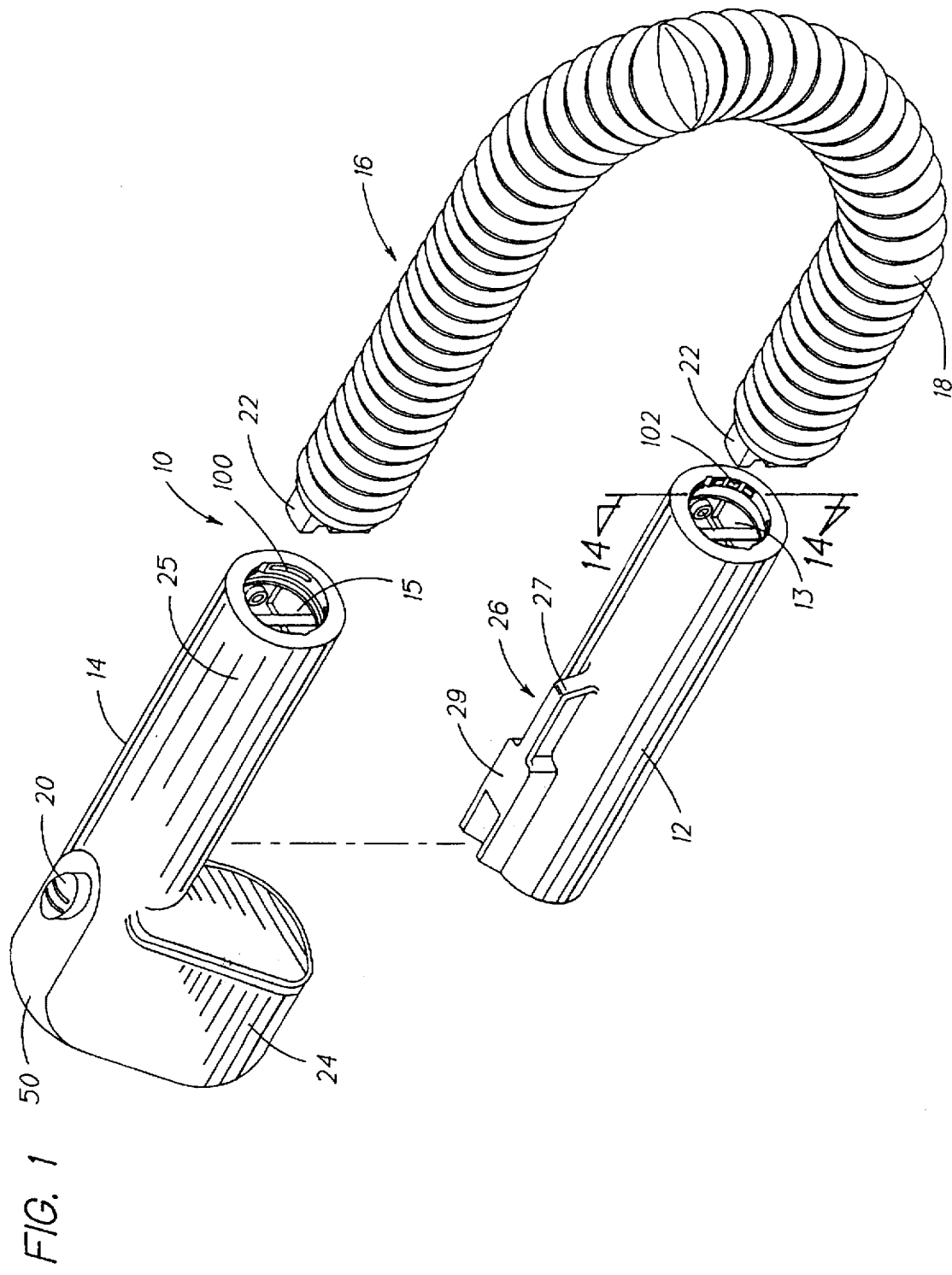
FIG. 1 is a perspective, exploded view illustrating features of the flashlight of the invention.

Referring now to the various figures of the drawing, there is disclosed a preferred embodiment of the present invention. In referring to the various figures of the drawing, like numerals shall refer to like parts.

Referring specifically to FIG. 1, there is disclosed a flashlight 10 having a first housing 12 and a second housing 14. Housings 12 and 14 are spaced apart and are connected together through a flexible core 16. Housing 12 serves as the power end of the flashlight and contains therewithin batteries 78 and 80 (see FIG. 2) used as the primary source of electrical power for the flashlight. Batteries 78 and 80 may be standard C-cells.

Figure 2:
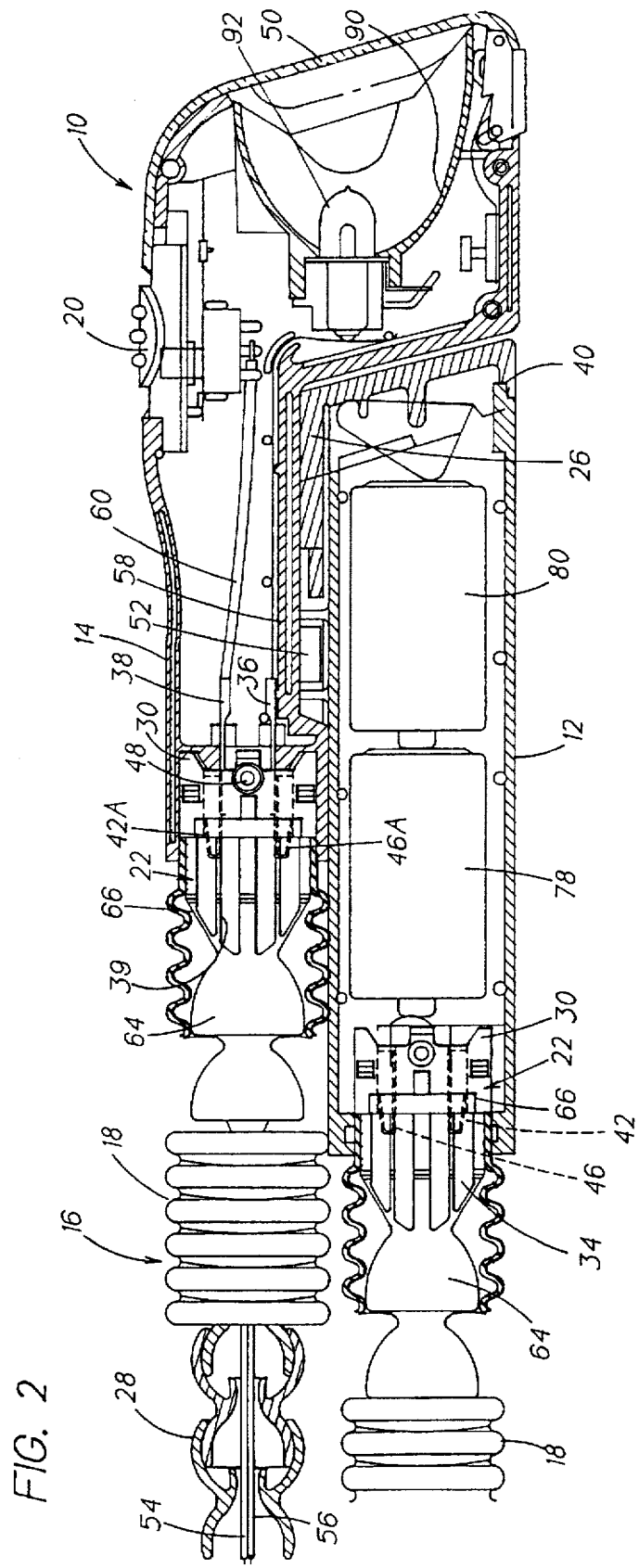
FIG. 2 is a side elevational view, partially in section, of the flashlight of FIG. 1.
Figure 3:
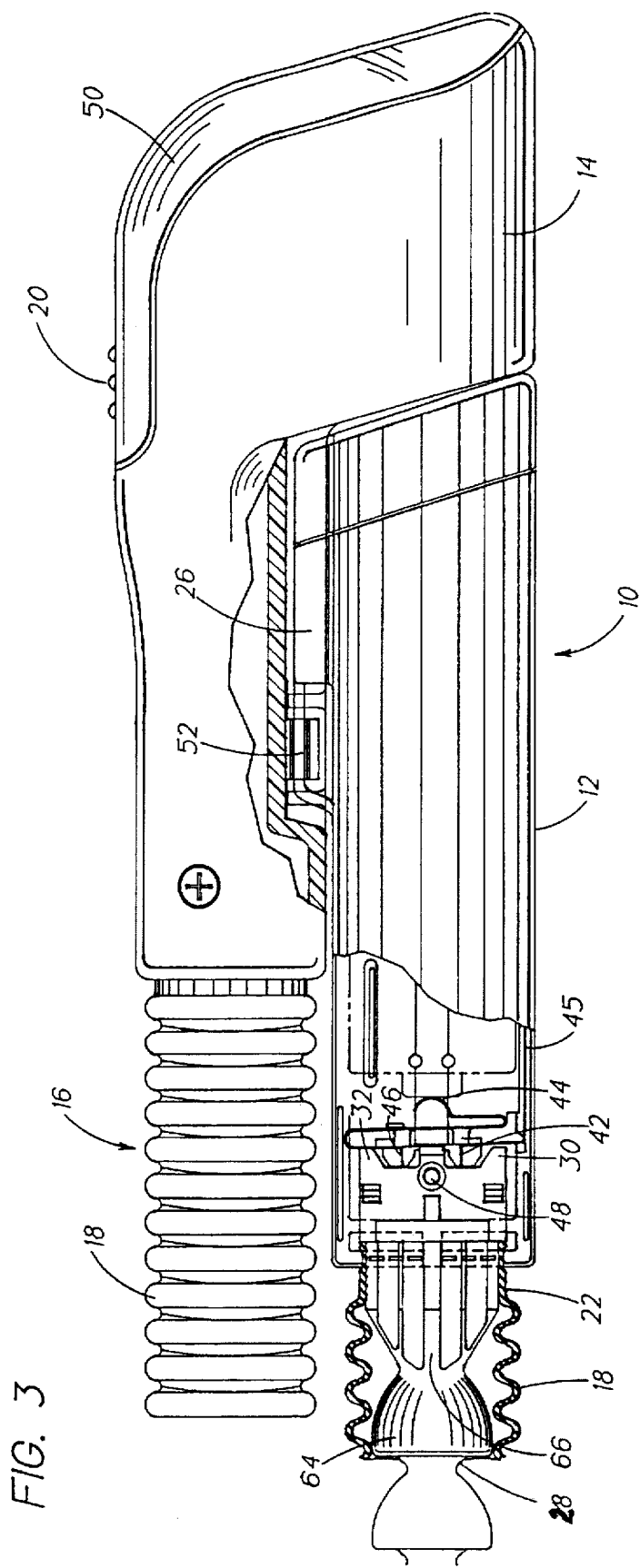
FIG. 3 is a side elevational view with portions broken away to illustrate further details of the flashlight.
Figure 4:
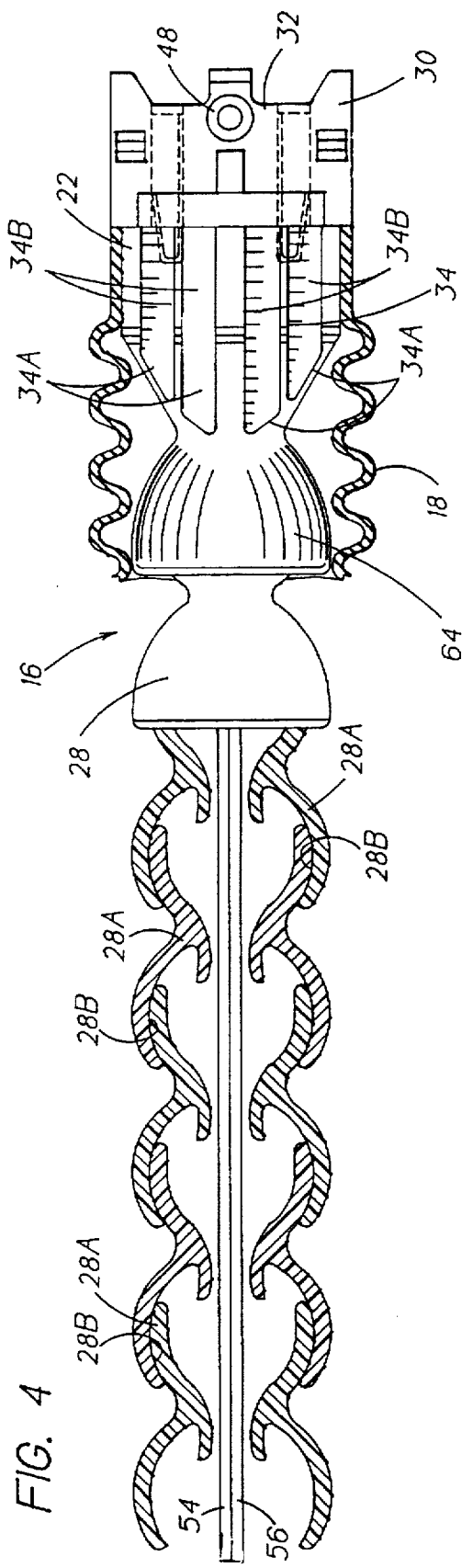
FIG. 4 is an enlarged elevational view illustrating details of a portion of the flashlight of the present invention.
Figure 5:
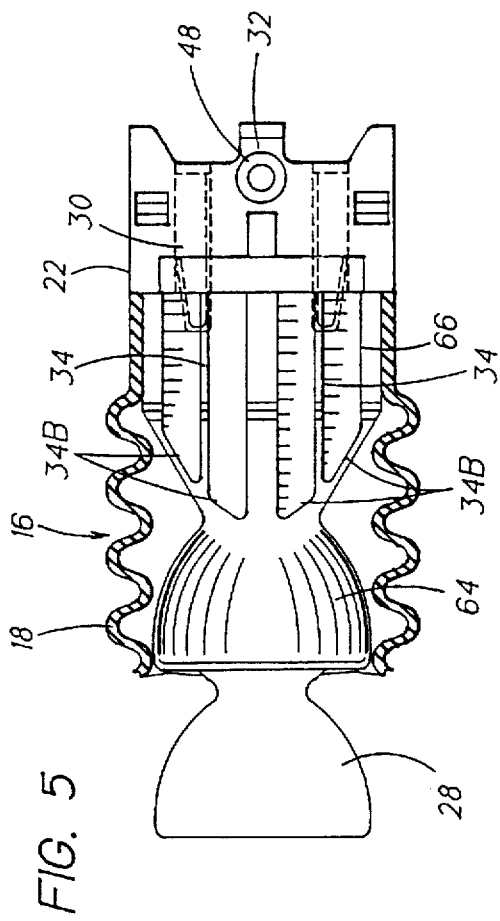
FIG. 5 is an enlarged elevational view of a further portion of the flashlight of the invention.
Figure 11:
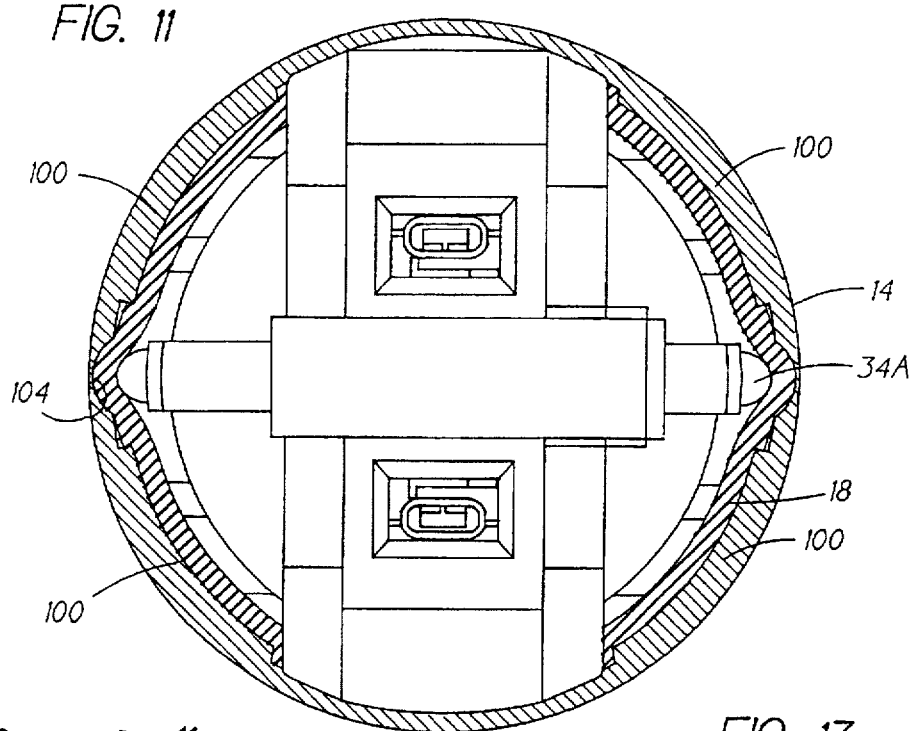
FIG. 11 is an enlarged sectional view taken along line 11—11 of FIG. 12.
Figure 12:
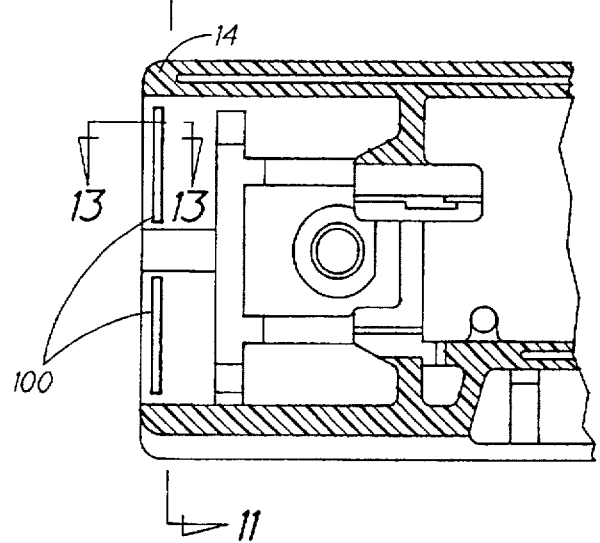
FIG. 12 is a fragmentary sectional view of a portion of one of the housings of the flashlight illustrating details thereof.

Housing 14 functions as the working end of flashlight 10 and includes a lens 50. As shown in FIG. 2, housing 14 also has mounted therewithin reflector 90 and bulb 92. A switch 20 is provided to selectively connect bulb 92 to the source of electrical power such as batteries 78 and 80.

Housing 14 is generally L-shaped and includes a generally cylindrically-shaped elongated leg 25 and a somewhat rectangularly-shaped shorter leg 24 extending from leg 25. Leg 24 mounts lens 50, reflector 90, and bulb 92.

Housing 12 includes a bore 13 and leg 25 of housing 14 includes a similar bore 15. One end of flexible core 16 is inserted into bore 15 and the other end is inserted into bore 13. Each end of core 16 has an anchor 22 to be more fully described hereinafter which is inserted into one of the bores 13, 15 for joining flexible core 18 to housings 12 and 14.

Referring primarily to FIGS. 2–10, additional features of flashlight 10 shall now be described in detail. Flexible core 16 includes an outer resilient sleeve 18 made from a resilient elastomeric material such as a thermoplastic rubber sold by the Monsanto Corporation under the trademark "Santoprene." Referring particularly to FIG. 4 a flexible spine 28 is contained within sleeve 18. Spine 28 comprises a plurality of interconnected universally rotatable members. Each universally rotatable member comprises a male end portion 28A and a female end portion 28B. The male end portion 28A has an outer surface comprising a frustum of a sphere and the female end portion 28B has a mating inner surface comprising a frustum of a sphere which is dimensioned so that, when the male end portion 28A is inserted into the female end portion 28B, there is frictional contact between the mating outer and inner surfaces 28A and 28B. These frictional forces function as retaining means to hold one member of the flexible spine 28 at any desired location relative to an interconnected member. These frictional forces may be overcome which permits interconnected members to be moved relative to each other so that their longitudinal axes may either be in or out of alignment. The interconnected segments have relatively unrestricted rotational movement therebetween. The segments of the flexible spine 28 are produced by Lockwood Products, Inc. and are made from acetal plastic or other suitable material. Electrical conductors 54 and 56 are disposed within flexible spine 28. One end of conductors 54, 56 is connected to housing 12 and the other end of the conductors is connected to working end housing 14.

Sleeve 18 provides a protective cover over spine 28. The sleeve maintains an attractive appearance of the flashlight even when the individual members of spine 28 are skewed relative to each other.

An anchor 22 is connected to each end of flexible core 16. One of the anchors is inserted into bore 13 of housing 12 and the other of the anchors is inserted into bore 15 of housing 14. Anchor 22 includes a ball portion 64, a main body portion 66 which includes a plurality of upstanding ribs 34 and a somewhat rectangularly shaped portion 30. The height of center rib 34A is somewhat greater when compared to the height of the other ribs 34 of each anchor 22. As will be more fully described hereinafter, portion 30 has an open end facing away from body portion 66 for receiving strain relief 32 therewithin. Each rib 34 includes a ramp-like leading surface 34B for expanding the material of sleeve 18 outwardly to enable each end of the sleeve to be emplaced about an anchor.

Strain relief 32 includes a pair of longitudinally spaced slots 47. Strain relief 32 mounted within housing 14 receives contacts 36, 38 in slots 47 while strain relief 32 mounted in housing 12 receives contacts 42, 46 in slots 47. The strain relief electrically connects conductors 54,56 to the contacts in each housing 12, 14. Contact 42 in housing 12 is, in turn, connected to negative strip conductor 45 while contact 42 is connected to positive conductor 44. (See FIG. 3) Conductors 44 and 45 are, in turn, connected to batteries 78 and 80. Housing 12 includes a removable battery cap 40. Contacts 36, 38 are connected to conductors 58, 60 in housing 14.

As shown, switch 20 is in series with conductor 58. As is known to those skilled in the art, switch 20 is normally open and is closed to connect bulb 92 to batteries 78, 80 via the various electrical conductors and contacts noted previously.

Referring specifically to FIGS. 1 and 6, one of the housings, for example housing 12 includes an upstanding rib 26. Rib 26 includes a relatively thin elongated portion 27 connected to a relatively wide elongated portion 29. The other of the housings, for example housing 14 includes a groove 68 whose length is generally coextensive with the length of upstanding rib 26. Groove 68 is generally U-shaped and includes a pair of spring clips 52. Spring clips 52 are placed within groove 68 in a portion which overlies relatively narrow portion 27 of rib 26. If it is desired to reduce the overall length of flashlight 10, for example, for storage purposes, or for holding the flashlight for use in a conventional hand-held manner, core 16 is folded so that the core forms a generally U-shape so that housing 12 lies in the same vertical plane as housing 14. As shown specifically in FIG. 6, when core 16 is folded as described, rib 26 underlies U-shaped groove 68. To join the two housings together, rib 26 is snapped into groove 68. Relatively narrow portion 27 of rib 26 is inserted between the opposed faces of spring clips 52 which forces the opposed faces outwardly. When the rib is inserted into the groove, the opposed faces of the spring clip are forced inwardly to lock the rib within groove 68 to positively join the two housings together.

As described previously, each end of flexible core 16 includes an anchor 22. One of the anchors is inserted into bore 13 and the other of the anchors is inserted into bore 15. During testing, it has been found that twisting or turning the flexible core to obtain a desired configuration for the flashlight produces forces which tend to pull the sleeve from either or both bores of the housings or twist either end of sleeve 18 relative to bores 13 or 15. To prevent the undesired occurrence of the separation of sleeve 18 from one or both housings and the undesired twisting of sleeve 18 relative to the housings, grasping means, to be more fully described hereinafter, have been added to both bores 13, 15 and anchors 22.

Referring specifically to FIGS. 11–14, each bore 13, 15 is provided with a plurality of circumferentially spaced inwardly extending ridges respectively 100 and 102. Ridges 100 and 102 extend radially inwardly towards the surface of sleeve 18. In addition, each bore includes a pair of 180 degree circumferentially spaced grooves 104 which underly ribs 34A when each anchor 22 is placed in a respective bore 13, 15.

Figure 13:
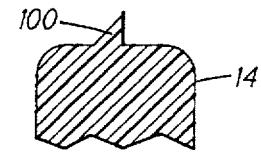
FIG. 13 is an enlarged sectional view taken along line 13—13 of FIG. 12.
Figure 14:
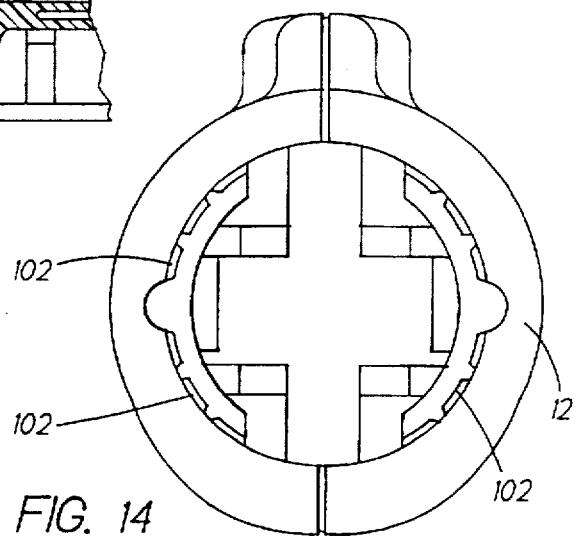
FIG. 14 is an end view taken along line 14—14 of FIG. 1.

Housing 14 includes four circumferentially spaced ridges 100 whereas housing 12 includes 12 circumferentially spaced ridges 102. The length of each ridge 100 is greater than the length of each ridge 102. As shown in FIG. 13, the cross-sectional shape of each ridge 100 (or 102) is similar to a shark's tooth so that the outer surface of the sleeve engaged by each ridge 100, 102 is firmly grasped to sandwich the sleeve between the outer surface of anchor 22 and the outer surface of each ridge. This arrangement prevents the sleeve from being twisted relative to each bore 13, 15 and prevents the sleeve from being separated from one or the other of housings 12, 14.

To further prevent any undesired twisting or longitudinal movement of the sleeve, ribs 34A act to force the resilient material of sleeve 18 into the underlying grooves 104. The combination of ribs 34A and grooves 104 further prevent twisting of sleeve 18.

A further feature of the flashlight relates to strain relief 32. Strain relief 32 includes a hub portion 48 having a relatively enlarged boss 48A formed at one end of the hub. The other end of the hub does not have an enlarged boss similar to boss 48A and the end of the hub lies in the same vertical plane relative to the vertical plane of the end face of body portion 30 of anchor 22.

Each housing 12, 14, includes a relatively large inwardly extending boss 69 and a second circumferentially spaced relatively smaller boss 69A. When each anchor 22 and its associated strain relief 32 is inserted into one of the bores 13, 15, enlarged boss 48A of strain relief 32 is aligned with relatively smaller boss 69A of the housing and the flat surface 48B of the hub is aligned with relatively large boss 69 of the housing. In effect, the strain relief can only be inserted within the bore in one position due to the relationships established by bosses 48A, 69A and 69B and the flat surface 48B of hub 48. The foregoing enables anchor 22 and strain relief 32 to be used with a polarized plug. A screw 67 or similar means is inserted through boss 69, hub 48 and boss 69A to affix each anchor 22 to its respective housing.

While a preferred embodiment of the present invention has been described and illustrated, the invention should not be limited thereto but may be otherwise embodied within the scope of the following claims.

What is claimed is:

1. A flashlight comprising:
   a base housing forming a power end for said flashlight and having means defining a longitudinally extending first bore;
   a working end housing spaced from said base housing and including means defining a longitudinally extending second bore;
   a flexible core assembly connecting said base housing to said working end housing and comprising a pair of conductive wires electrically connecting said base housing to said working end housing, a flexible spine including a plurality of interconnected and universally rotatable members, and a resilient sleeve member surrounding an outer surface of the rotatable members forming said spine; and
   a first anchor connected to a first end of said flexible core assembly and having a portion extending within a selected one of the bores of said base housing and said working end housing, said anchor including first gripping means underlying the resilient sleeve member of said flexible core assembly and said means defining said selected one bore including second gripping means overlying the sleeve of said flexible core assembly and sandwiching said sleeve between said first and second gripping means.

2. A flashlight in accordance with claim 1 wherein said selected one bore is the bore of said base housing.

3. A flashlight in accordance with claim 1 wherein said selected one bore is the bore of said working end housing.

4. A flashlight in accordance with claim 1 further including a second anchor connected to a second end of said flexible core assembly and having a portion extending within the other of said bores, said second anchor including third gripping means underlying the sleeve of said flexible core assembly and said means defining the other of said bores including fourth gripping means overlying the sleeve of said flexible core assembly and sandwiching said sleeve between said third and fourth gripping means.

5. A flashlight in accordance with claim 3 wherein said first and third gripping means comprise radially extending ribs.

6. A flashlight in accordance with claim 4 wherein each of said anchors has first locking means and each of the means defining said bores include second locking means for engaging said first locking means to maintain the flexible core assembly in a fixed circumferential position relative to the bores of said base and working end housings.

7. A flashlight in accordance with claim 5 wherein a selected one of said first and second locking means comprises a longitudinally extending rib and the other of said locking means comprises a complementary concave surface for receiving said ribs.

8. A flashlight in accordance with claim 1 wherein said first anchor has first locking means and said selected one bore includes second locking means for engaging said first locking means to maintain the flexible core in a fixed circumferential position relative to said bore.

9. A flashlight in accordance with claim 8 wherein a selected one of said first and second locking means comprises a longitudinally extending rib and the other of said locking means comprises a complementary concave surface for receiving said rib.

10. A flashlight comprising:
    a first end functioning as a tail for the flashlight;
    a second end including a housing having a bulb, a reflector and a lens mounted therewithin and spaced from said first end, said housing including means defining a longitudinally extending bore;
    a flexible core assembly connecting said first and second ends of said flashlight and comprising a flexible spine including a plurality of interconnected and universally rotatable members, and a resilient sleeve member surrounding an outer surface of the rotatable members forming said spine; and
    a first anchor connected to a first end of said flexible core assembly and having a portion extending within said bore of said housing, said anchor and said means defining said bore sandwiching said resilient sleeve therebetween for preventing circumferential movement of said sleeve relative to said bore.

11. A flashlight in accordance with claim 10 wherein said first end functions as a counterweight and the second end is capable of being oriented in a plurality of independent self-porting positions.

12. A flashlight in accordance with claim 10 wherein said anchor and said means defining said bore sandwich said resilient sleeve for preventing axial movement of said sleeve relative to said bore.

13. An electrically powered apparatus comprising:
    an end housing; a flexible core having a first end connected to the end housing at a first connection, the flexible core having a flexible spine of interconnected universally rotatable members and an anchor section at the first end and, an outer resilient sleeve on the spine;
    wherein the first connection includes the anchor section being universally rotatable on one of the members of the spine, extending into the end housing, and being stationarily fixed therein said first connection including a fastener extending through the end housing and into the anchor section to stationarily attach the anchor section to the end housing; and
    the end housing and the core including polarizing means for connecting the anchor section to the end housing in only one position, the fastener extending through the polarizing means.

14. An apparatus as in claim 13 wherein the core includes electrical conductors extending along the core inside the sleeve and into the anchor section.

15. An apparatus as in claim 14 further comprising electrical contacts connected to the conductors which are attached to the anchor section and form a removable connection with mating contacts in the end housing.

16. An apparatus as in claim 13 wherein an end of the sleeve extends into the end housing and is stationarily fixed between the end housing and the anchor section.

17. An apparatus as in claim 10 including first means to fix the position of the end of the sleeve in a first direction and second means to fix the position of the end of the sleeve in a second direction.

18. An apparatus as in claim 16 wherein the end housing comprises inwardly extending projections forming a receiving area for receiving the anchor section and the end of the sleeve.

19. An apparatus as in claim 16 wherein the end housing has a receiving area for receiving the anchor section and the end of the sleeve, the end housing having a groove at the receiving area, the anchor section having an outwardly extending rib that sandwiches a portion of the end of the sleeve into the groove.

20. An apparatus as in claim 16 wherein the end housing has a receiving area for receiving the anchor section and the end of the sleeve, the end housing having an outwardly extending rib at the receiving area, the anchor section having a groove, said rib sandwiching a portion of the end of the sleeve into the groove.

21. An electrically powered apparatus comprising:
an end housing;
a flexible core having an end connected to the end housing at a first connection, the flexible core having a flexible spine and an outer resilient sleeve, an anchor section of the flexible spine being located in the end housing and being stationarily fixed thereto; and
at least two electrical conductors extending through the flexible core and into the end housing, the conductors extending into an aperture in the anchor section,
wherein the anchor section includes a strain relief section connected to the conductors.

22. An apparatus as in claim 21 wherein the first connection includes a fastener that extends through the end housing and into the anchor section to stationarily attach the anchor section to the end housing.

23. An apparatus as in claim 22 wherein the end housing and the core include polarizing means to allow connection of the anchor section to the end housing in only one position, the fastener extending through the polarizing means.

24. An apparatus as in claim 23 further comprising electrical contacts connected to the conductors which are attached to the anchor section and form a removable connection with mating contacts in the end housing.

25. An apparatus as in claim 21 wherein an end of the sleeve extends into the end housing and is stationarily fixed between the end housing and the anchor section.

26. An apparatus as in claim 25 including first means to fix the position of the end of the sleeve in a first direction and second means to fix the position of the end of the sleeve in a second direction.

27. An apparatus as in claim 25 wherein the end housing comprises inwardly extending projections in a receiving area that receives the anchor section and the end of the sleeve.

28. An apparatus as in claim 25 wherein the end housing has a receiving area for receiving the anchor section and the end of the sleeve, the end housing having a groove at the receiving area, the anchor section having an outwardly extending rib that sandwiches a portion of the end of the sleeve into the groove.

29. An electrically powered apparatus comprising:
a first section having an end housing and two first electrical contacts connected to the end housing; and
a second section having a flexible core, two electrical conductors extending inside the flexible core, and two second electrical contacts electrically connected to the two electrical conductors, the flexible core having a flexible spine with a flexible sleeve on the spine, an end of the second section being connected to the end housing at a connection area with the first electrical contacts being removably connected to the second electrical contacts;
wherein the end housing and the end of the second section are configured to allow connection of the first and second electrical contacts to each other in only one polarized position.

30. An apparatus as in claim 27 wherein the connection area of the first and second sections includes a fastener that extends through the end housing and into the end of the second section to stationarily attach the end of the second section to the end housing.

31. An apparatus as in claim 29 wherein an end of the sleeve extends into the end housing and is stationarily fixed between the end housing and an end of the spine.

32. An apparatus as in claim 31 including first means to fix the position of the end of the sleeve in a first direction and second means to fix the position of the end of the sleeve in a second direction.

33. An apparatus as in claim 31 wherein the end housing comprises inwardly extending projections in a receiving area that receives the anchor section and the end of the sleeve.

34. An apparatus as in claim 31 wherein the end housing has a receiving area for receiving the end of the spine and the end of the sleeve, the end housing having a groove at the receiving area, the end of the spine having an outwardly extending rib that sandwiches a portion of the end of the sleeve into the groove.

35. An electrically powered apparatus comprising:
a flexible core having a flexible spine, a flexible sleeve on the spine, and electrical conductors extending along the core inside the sleeve;
an end housing connected to an end of the spine at an end housing connected to an end of the spine at a connection area;
means for stationarily connecting an end of the flexible sleeve between the end housing and the end of the spine at the connection area,
said connection of the end housing to the spine including a fastener extending through the end housing and into the end of the spine to stationarily attach the end of the spine to the end housing; and
said end housing and the end of the spine including polarizing means for connecting the end of the spine to the end housing in only one position, the fastener extending through the polarizing means.

36. An apparatus as in claim 35 further comprising electrical contacts connected to the conductors which are attached to the end of the spine and form a removable connection with mating contacts in the end housing.

37. An apparatus as in claim 35 wherein an end of the sleeve extends into the end housing and is stationarily fixed between the end housing and the end of the spine.

38. An apparatus as in claim 37 including first means to fix the position of the end of the sleeve in a first direction and second means to fix the position of the end of the sleeve in a second direction.

39. An apparatus as in claim 37 wherein the end housing comprises inwardly extending projections in a receiving area that receives the end of the spine and the end of the sleeve.

40. An apparatus as in claim 37 wherein the end housing has a groove at the receiving area, the end of the spine having an outwardly extending rib that sandwiches a portion of the end of the sleeve into the groove.

41. A flashlight comprising:
   a base housing for containing a battery extending to a tubular open end;
   a working end housing spaced from said base housing and including a reflector, a lens, and a bulb for energization by the battery, said working end housing extending to a tubular open end;
   an elongated articulated flexible core assembly connecting said base housing and said working end housing extending between a base end for attachment to said base housing by insertion into said tubular open end thereof and a working end for attachment to said working end housing by insertion into said tubular open end thereof, said flexible core assembly including conductive means electrically connecting the battery and said light bulb; and
   anchor means on said flexible core assembly for securely attaching said base end to said tubular open end of said base housing and said working end to said tubular open end of said working end housing.

42. A flashlight as set forth in claim 41
   wherein said anchor means includes:
   electrical connector means in continuity with said conductive means for releasable connection electrically with the battery and with said light bulb; and
   fail safe means permitting attachment of said base end to said tubular open end of said base housing and of said working end to said tubular open end of said working end housing in one orientation only which assures compatibility with a polarized plug connected to said conductive wires.

43. A flashlight as set forth in claim 41
   wherein said flexible core assembly includes a continuous longitudinally extending channel therethrough;
   wherein said conductive means includes conductive wires extending through the channel of said flexible core assembly; and
   wherein said anchor means includes electrical connector means in continuity with said conductive wires for releasable connection electrically with the battery and with said light bulb.

44. A flashlight as set forth in claim 43
   wherein said anchor means includes a pair of flattened electrical sockets in electrical continuity with said conductive wires; and including:
   electrical conductors extending to and in continuity with the battery and with said light bulb, respectively, and terminated, at blade contacts releasably engageable with said electrical sockets to electrically connect the battery to said light bulb.

45. A flashlight as set forth in claim 42
   wherein said anchor means includes:
   a base anchor member for securely attaching said base end to said tubular open end of said base housing;
   a working anchor member for securely attaching said working end to said tubular open end of said working end housing; and
   wherein said fail safe means includes:
   interengaging features, respectively, on said base anchor member and on said base end housing and on said working anchor member and on said working end housing such that attachment of said base end to said tubular open end of said base housing and of said working end to said tubular open end of said working end housing permits one orientation only which assures compatibility with a polarized plug to said conductive wires.

46. A flashlight as set forth in claim 41
   wherein said flexible core assembly includes:
   a spine member comprised of a plurality of mutually pivotable interengaging members; and
   a resilient tubular sleeve containing said spine member and said anchor means;
   wherein said anchor means includes:
   a base anchor member for securely attaching said base end to said tubular open end of said base housing;
   a working anchor member for securely attaching said working end to said tubular open end of said working end housing; and
   wherein said base housing includes base clamping means adjacent said tubular open end thereof engageable with said resilient sleeve for assuring the firm engagement of said sleeve with said base anchor member; and
   wherein said working end housing includes working clamping means adjacent said tubular open end thereof engageable with said resilient sleeve for assuring the firm engagement of said sleeve with said working anchor member.

47. A flashlight as set forth in claim 41
   wherein said base clamping means includes a first set of mutually cooperating clamping elements and a second set of mutually cooperating clamping elements, said first set of mutually cooperating clamping elements extending in directions transverse of said second set of mutually cooperating clamping elements; and
   wherein said working clamping means includes a first set of mutually cooperating clamping elements and a second set of mutually cooperating clamping elements, said first set of mutually cooperating clamping elements extending in directions transverse of said second set of mutually cooperating clamping elements.

48. A flashlight as set forth in claim 41
   wherein said base housing has a pair of diametrically opposed fastener receiving bores spaced from said tubular open end thereof; and
   wherein said working end housing has a pair of diametrically opposed fastener receiving bores spaced from said tubular open end thereof; and
   wherein said anchor means includes:
   a base anchor member having a transverse bore therethrough for securely attaching said base end to said tubular open end of said base housing and an elongated fastener for mounting reception through the transverse bore and through the fastener receiving bores in said base housing to thereby fixedly attach said base anchor member to said flexible core assembly; and
   a working anchor member having a transverse bore therethrough for securely attaching said working end to said tubular open end of said working end housing and an elongated fastener for mounting reception through the transverse bore and through the fastener receiving bores in said working end housing to thereby fixedly attach said base anchor member to said flexible core assembly.

49. A flashlight as set forth in claim 42 including:

electrical conductors terminating at contacts engageable with said electrical connector means and extending to and in continuity with the battery and with said light bulb, respectively; and wherein said anchor means includes:

strain relief means for preventing separation of said contacts from said electrical connector means upon the application of force between said flexible core assembly and each of said base housing and said working end housing.

50. A flashlight as set forth in claim 41 wherein said base housing has a pair of diametrically opposed fastener receiving bores spaced from said tubular open end thereof; and wherein said working end housing has a pair of diametrically opposed fastener receiving bores spaced from said tubular open end thereof; and wherein said strain relief means includes:

a base anchor member having a transverse bore therethrough for securely attaching said base end to said tubular open end of said base housing and an elongated fastener for mounting reception through the transverse bore and through the fastener receiving bores in said base housing to thereby fixedly attach said base anchor member to said flexible core assembly and electrical connector means on said base anchor member in continuity with said conductive wires for releasable connection electrically with the battery; and a working anchor member having a transverse bore therethrough for securely attaching said working end to said tubular open end of said working end housing and an elongated fastener for mounting reception through the transverse bore and through the fastener receiving bores in said working end housing to thereby fixedly attach said base anchor member to said flexible core assembly and electrical connector means in continuity with said conductive wires for releasable connection electrically with said light bulb.

51. A flashlight as set forth in claim 41 wherein said flexible core assembly includes:

a spine member comprised of a plurality of mutually pivotable interengaging members; and a resilient sleeve overlying said spine member and said anchor means; and including:

first and second clamping means for preventing relative twisting about a longitudinally extending axis of said flexible core assembly and each of said base housing and said working end housing and for preventing relative longitudinal separation of said flexible core assembly from either of said base housing and said working end housing.

52. A flashlight as set forth in claim 51 wherein said first clamping means are disposed generally in a longitudinally extending direction; and wherein said second clamping means are disposed generally in a transversely extending direction.

53. A flashlight as set forth in claim 52 wherein said first clamping means include a longitudinally extending rib member on said anchor means and said working end housing having a longitudinally extending groove juxtaposed with said rib member for pressing said resilient sleeve into firm engagement therewith; and wherein said second clamping means include a plurality of circumferentially spaced ridges projecting radially from an inner surface of said working end housing and of said base housing and spaced inwardly from said tubular open end thereof and lying generally in a transversely disposed plane, said ridges pressing said resilient sleeve into firm engagement with an outer surface of said anchor means.

54. A flashlight as set forth in claim 53 wherein said first clamping means include a pair of longitudinally extending rib members on said anchor means at diametrically opposite locations and said working end housing having a pair of longitudinally extending grooves at diametrically opposed locations juxtaposed with said rib members for pressing said resilient sleeve into firm engagement therewith; and wherein said second clamping means include a plurality of circumferentially spaced ridges projecting radially from an inner surface of said working end housing and of said base housing and spaced inwardly from said tubular open end thereof and lying generally in a transversely disposed plane, said ridges pressing said resilient sleeve into firm engagement with an outer surface of said anchor means.

55. A flashlight as set forth in claim 41 wherein said flexible core assembly includes:

a spine member comprised of a plurality of mutually pivotable interengaging members; and a resilient sleeve overlying said spine member and said anchor means; and including:

enlarged formations on said base housing and on said working end housing engageable with said resilient sleeve to press said resilient sleeve into engagement with an associated one of said anchor means for preventing relative twisting about a longitudinally extending axis of said flexible core assembly and each of said base housing and said working end housing and for preventing relative longitudinal separation of said flexible core assembly from either of said base housing and said working end housing.

56. A method of assembly of a flashlight comprising the steps of:

providing a tubular mounting end of a base housing for containing a battery with at least one enlarged inwardly projecting formation thereon;

providing a tubular mounting end of a working end housing spaced from the base housing and including a reflector, a lens, and a bulb for energization by the battery;

clamping the tubular mounting end of the base housing onto a first end of an elongated articulated flexible core assembly including a spine member comprised of a plurality of mutually pivotable interengaging members extending to an anchor member and a resilient tubular sleeve containing the spine member so as to firmly engage the resilient sleeve and impress said sleeve against the anchor member; and clamping the tubular mounting end of the working end housing onto a first end of an elongated articulated flexible core assembly including a spine member comprised of a plurality of mutually pivotable interengaging members extending to an anchor member and a resilient tubular sleeve containing the spine member so as to firmly engage the resilient sleeve and impress said sleeve against the anchor member.

57. A method of assembly comprising the steps of:

providing a tubular mounting end of an operative housing with at least one longitudinally extending groove therein; and clamping the tubular mounting end of the operative housing onto an end of an elongated articulated flexible core assembly including a spine member comprised of a plurality of mutually pivotable interengaging members extending to an anchor member and a resilient tubular sleeve containing the spine, said anchor member having at least one longitudinally extending rib correlating with the longitudinally extending groove on the tubular mounting end of the operative housing so as to firmly engage the resilient sleeve and impress said sleeve against the anchor member.

58. An electrical device comprising:

a flexible spine having first and second ends, at least one anchor member being connected to one of said first and second ends thereof;

a flexible sleeve disposed about said spine to provide a protective cover thereover;

a housing having a socket for receiving a portion of the at least one anchor member therein, said housing further having a first electrical contact disposed therein;

an electrical conductor disposed within said flexible sleeve and connected to a second electrical contact disposed within said anchor member;

wherein said electrical conductor becoming electrically connected with the first contact in said housing when a portion of the anchor member is disposed within the socket of said housing thereby effecting engagement of the first and second contacts with one another said socket includes means for fixing the at least one anchor member to said housing;

said socket and said portion of said at least one anchor member are correspondingly shaped to prevent relative rotation therebetween; and said socket is further configured to receive both said portion of said at least one anchor member and a distal end region of said sleeve member.

59. An electrical device as defined in claim 58 further characterized in that said second electrical contact is securely connected to said anchor so as to serve as a strain relief.

60. An electrical device as defined in claim 59 further characterized in that said means for affixing the at least one anchor to said housing connects said second electrical contact securely to said anchor.

61. An electrical device as defined in claim 60 further characterized in that said socket is formed with at least one radially inwardly directed projection which coacts with the distal end region of said sleeve to prevent relative axial movement therebetween.

62. An electrical device as defined in claim 61 further characterized in that said first electrical contact is a male contact recessed within said socket and said second electrical contact is a female contact which is axially disposed on the portion of the at least one anchor member.

63. An electrical device as defined in claim 62 further characterized in that said housing socket has at least one radially inwardly directed projection which clamps said distal end region of said sleeve member.

64. A flashlight comprising a working end housing supporting at least a reflector, a lens, a light bulb and including means defining a longitudinally extending bore; and a flexible core assembly including a flexible spine comprising a plurality of interconnected and universally rotatable members, and a resilient sleeve member surrounding an outer surface of each of the rotatable members forming said spine, said sleeve including a first end extending into the bore of inwardly extending ridges for engaging the outer surface of said sleeve, said flexible spine including an anchor member underlying said portion of said sleeve extending into said bore of said housing and sandwiching said sleeve between an outer surface of said anchor and said plurality of ridges.

65. A flashlight in accordance with claim 64 including at least one assembly securing means extending laterally through a first hole formed in said housing, and a second hole formed in said anchor for securing said anchor to said housing.

66. A flashlight in accordance with claim 65 wherein said inwardly extending ridges are formed integrally with the means defining said longitudinally extending bore.

67. A flashlight in accordance with claim 64 wherein said inwardly extending ridges are formed integrally with the means defining said longitudinally extending bore.

* * * * *